(12) United States Patent
Schneider et al.

(10) Patent No.: US 7,891,169 B2
(45) Date of Patent: Feb. 22, 2011

(54) PROCEDURE AND CONTROL DEVICE TO DIAGNOSE A CATALYTIC CONVERTER SYSTEM OF AN INTERNAL COMBUSTION ENGINE

(75) Inventors: Erich Schneider, Kirchheim (DE); Qiang Qiu, Ditzingen (DE); Christoph Woll, Gerlingen (DE); Peter Doebler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 11/644,053

(22) Filed: Dec. 21, 2006

(65) Prior Publication Data
US 2007/0203635 A1  Aug. 30, 2007

(30) Foreign Application Priority Data
Dec. 23, 2005  (DE) ..................... 10 2005 062 122

(51) Int. Cl.
*F01N 3/00* (2006.01)
(52) U.S. Cl. .............. 60/277; 60/274; 60/285
(58) Field of Classification Search ............... 60/277, 60/274, 276, 285
See application file for complete search history.

(56) References Cited

U.S. PATENT DOCUMENTS

| | | | |
|---|---|---|---|
| 6,151,889 A * | 11/2000 | Davey et al. ............... | 60/277 |
| 6,167,754 B1 * | 1/2001 | Koenders .................... | 73/116 |
| 6,401,452 B1 * | 6/2002 | Davey et al. ............... | 60/277 |
| 6,425,242 B2 * | 7/2002 | Booth et al. ............... | 60/277 |
| 6,467,254 B1 * | 10/2002 | Cullen et al. .............. | 60/274 |
| 6,550,240 B2 * | 4/2003 | Kolmanovsky et al. ..... | 60/285 |
| 6,735,939 B2 * | 5/2004 | Surnilla ..................... | 60/285 |
| 6,840,035 B2 * | 1/2005 | Tamura ...................... | 60/277 |
| 6,882,928 B2 * | 4/2005 | Yurgil ........................ | 701/114 |

FOREIGN PATENT DOCUMENTS

| EP | 1457654 | 9/2004 |
|---|---|---|
| FR | 2849471 | 2/2004 |

* cited by examiner

*Primary Examiner*—Tu M Nguyen
(74) *Attorney, Agent, or Firm*—Merchant & Gould P.C.

(57) ABSTRACT

A procedure is introduced to diagnose a catalytic converter system with at least two catalytic converters, through which separate exhaust gas flows flow, with the steps: test if oxygen storage capacities of the catalytic converters, which are at least two in number, exceed a predetermined threshold value. The procedure characterizes itself, in that the oxygen storage capacity of the first of two catalytic converters is compared with at least one first threshold value, in that an additional threshold value is ascertained as a function of a result of the comparison and in that the oxygen storage capacity of the second of two catalytic converters is compared with the additional threshold value. Additionally a control device is introduced, which executes the procedure.

8 Claims, 3 Drawing Sheets

Figure 1:
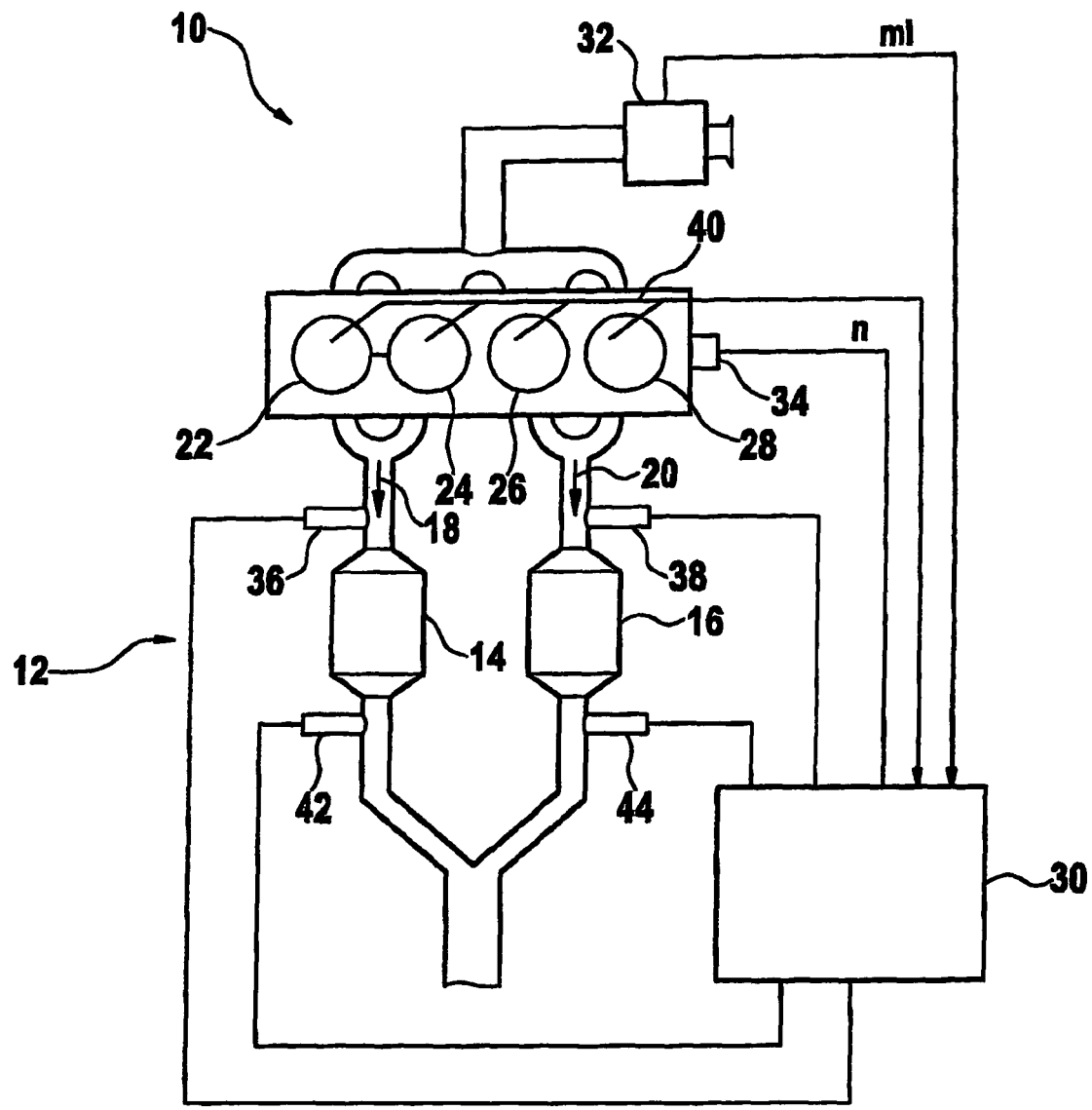

PROCEDURE AND CONTROL DEVICE TO DIAGNOSE A CATALYTIC CONVERTER SYSTEM OF AN INTERNAL COMBUSTION ENGINE

The invention concerns a procedure and a control device to diagnose a catalytic converter system with at least two catalytic converters according to the preambles of the independent claims. Such a procedure and such a control device is in each case per se known.

On the basis of demands of the legislators in the USA and in the EU, components relevant to the exhaust gas of motor vehicles during the operation of the motor vehicle must be monitored. Catalytic converters are among these components, which among other things convert the hydrocarbons (HC) contained in the exhaust gas with oxygen to water and carbon dioxide. In so doing, one assumes a correlation between the HC-conversion capability and an oxygen storage capacity of the catalytic converter. The oxygen storage capacity can be determined in the operation of the motor vehicle by evaluation of signals of oxygen sensitive exhaust gas sensors and signals of other sensors, from which an exhaust gas mass flow can be determined.

If the oxygen storage capability of a catalytic converter falls short of a predetermined threshold value, a corresponding error message is deposited in the control device. After statistical affirmation of the error signal, an error lamp (malfunction indicator light MIL) is turned on, which requests the driver to have the vehicle serviced. The catalytic converter judged to be defective is then replaced at the service center. Up until now, catalytic converters in catalytic converter systems of the kind mentioned above have been individually tested and assessed.

The invention differentiates itself in each case from this state of the art by way of the characteristics of the independent claims. By means of the invention, the catalytic converters are jointly assessed. In catalytic converter systems of the kind mentioned at the beginning of the application, it can occur that the catalytic converters deplete at different speeds. Such differing rates of depletion can arise, for example, from combustion break downs in a cylinder, whose exhaust gas flows into one of the two catalytic converters. The combustion break downs lead to an entry of non-combusted hydrocarbons and oxygen into the affected catalytic converter. The exothermal reaction of these exhaust gas components leads to a temperature elevation, which causes the affected cylinder to deplete faster. As a logical consequence, the affected catalytic converter is recognized as defective according to the known procedure, if its oxygen storage capacity falls short of a predetermined threshold.

Because the affected catalytic converter has depleted excessively fast as a consequence of the break down of combustion, the other catalytic converter can still possess a good conversion capability. The conversion capability can especially still be so good, that it compensates for the insufficient conversion capability of the affected catalytic converter. The emissions emitted as a whole from the catalytic converter system do not exceed a predetermined limit value as long as a bonus of the better catalytic converter can compensate for a penalty (malus) of the worse catalytic converter.

With the invention the emissions of both banks are assessed together. The invention leads with this assessment to an adaptation of the On Board Diagnosis to the specified exhaust gas test cycles, in which the entire emissions of the combustion engine are collected and evaluated in an exhaust gas testing bag. A desired consequence is when a catalytic converter with a deteriorated conversion capability is only then indicated by the invention as defective, if the catalytic converter system as a whole no longer adequately converts the toxins. The point in time, in which the worse catalytic converter is to be replaced, can thereby be delayed, which leads to cost advantages during the operation of the motor vehicle.

Additional advantages result from the description, the dependent claims and the accompanying figures.

It is understood that the previously designated and the subsequent characteristics to still be explained are not only applicable in the respectively stated combination, but are also applicable in other combinations or individually without leaving the scope of the invention at hand.

Figure 2:
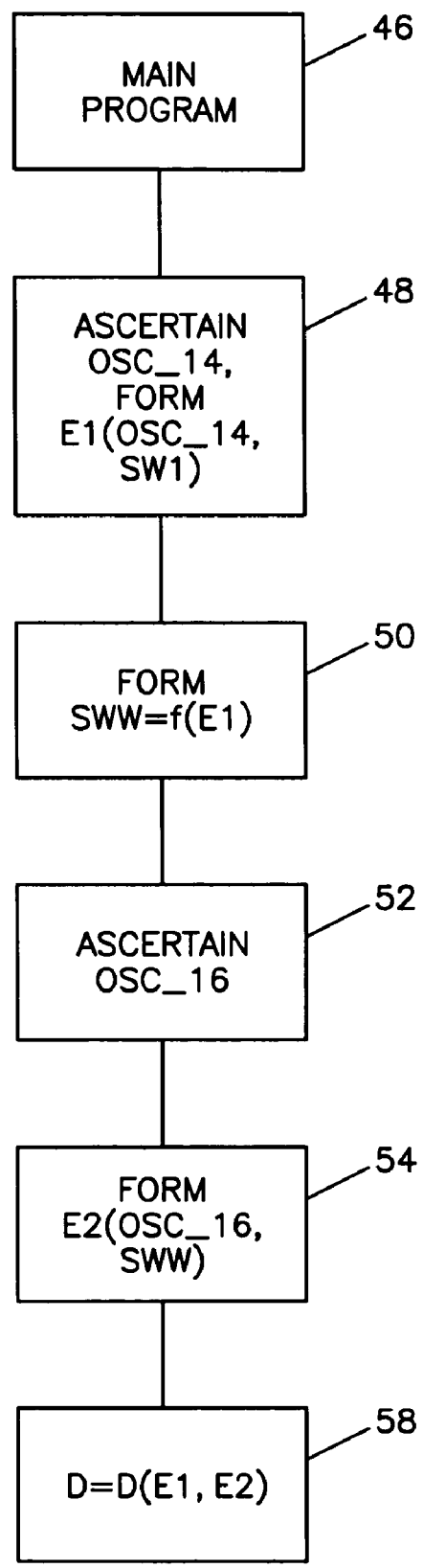
Figure 3:
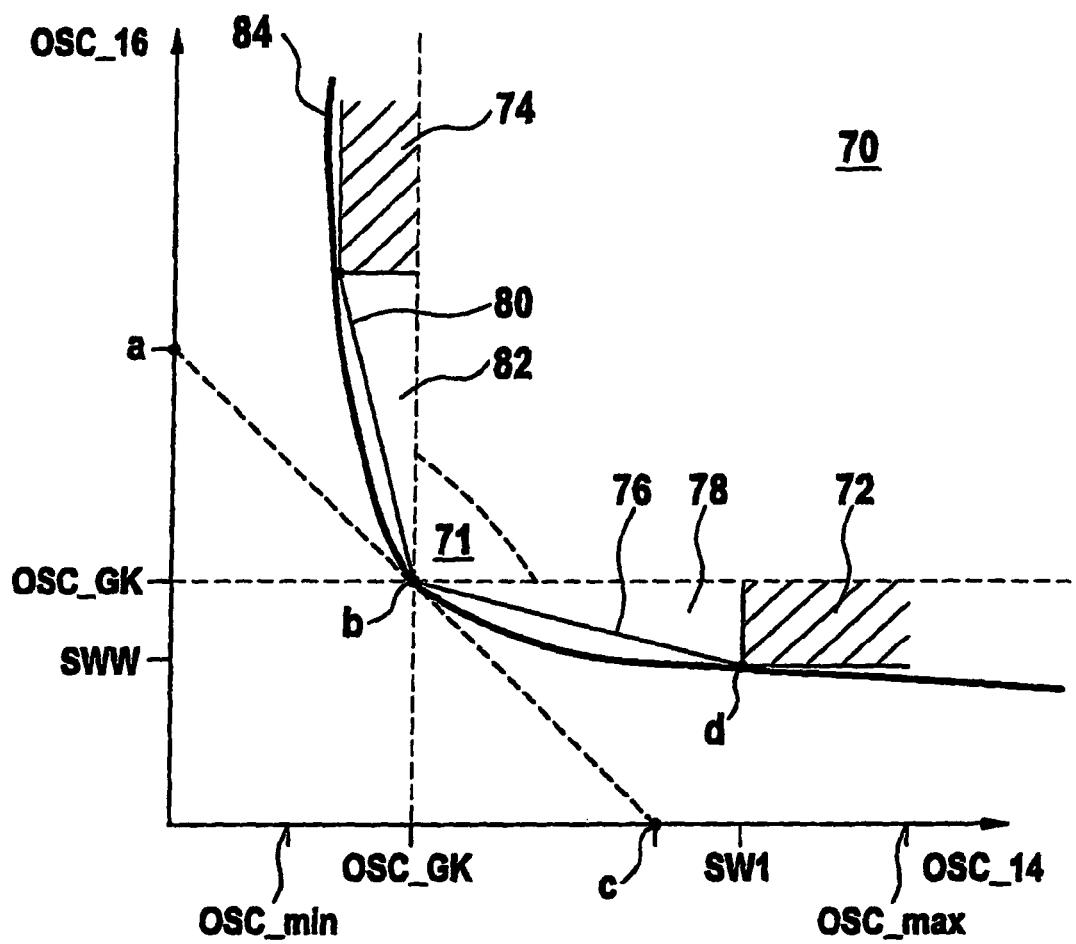

Examples of embodiment of the invention are depicted in the drawings and will be explained in more detail in the following description. The following are shown in each case in schematic form:

FIG. 1 the technical layout of the invention;

FIG. 2 a flow diagram as an example of embodiment of a procedure according to the invention; and FIG. 3 a coordinate system for the arrangement of different oxygen storage capacities in areas defined by threshold values.

FIG. 1 shows in detail an internal combustion engine 10 with a catalytic converter system 12, which has a first catalytic converter 14 and a second catalytic converter 16. Each of the two catalytic converters 14, 16 has an oxygen storage capacity $OSC\_14$, $OSC\_16$, which is dependent upon its degree of depletion, the temperature in the catalytic converter and the exhaust gas mass flow. Separate exhaust gas mass flows 18 and 20 flow through both catalytic converters 14 and 16. The first exhaust gas mass flow 18 carries exhaust gas from a first group of combustion chambers 22, 24 and the second exhaust gas mass flow 20 carries exhaust gas from a second group of combustion chambers 26, 28. The internal combustion engine 10 is the driving motor of a motor vehicle.

A control device 30 controls the internal combustion engine 10, in that it processes operational parameters of the internal combustion engine 10 and from these forms control variables for the engine management system of the internal combustion engine 10. Typical operating parameters are in this context an air intake mass mL, which is provided by an air mass gauge 32, and an engine rotational speed n, which is provided by a crankshaft angle sensor 34. From these parameters, the filling of the combustion chambers 22, 24, 26, 28 and thereby respectively a measurement for the first exhaust gas mass flow 18 and the second exhaust gas mass flow 20 can be determined. Together with information about the oxygen concentrations in front of the catalytic converters 14 and 16, the amount of oxygen flowing into the catalytic converter during an oxidized ambiance can then be determined. Analogously a reducing agent mass can be determined during a reductive exhaust gas ambiance, which flows into the catalytic converters 14, 16 and consumes stored oxygen there.

In the embodiment of FIG. 1 the oxygen concentration in front of the catalytic converter 14 is acquired by a first exhaust gas sensor 36. Analogously with that acquisition, the oxygen concentration in front of the second catalytic converter 16 is acquired by a second exhaust gas sensor 38. It is, however, understood that the oxygen concentrations in front of the catalytic converters 14 and 16 are essentially determined by the fuel/air-ratio in the combustion chambers 22, 24, 26, 28 and for that reason can also be mathematically ascertained as a function of the filling of the combustion chambers 22, 24, 26, 28 with air and the simultaneous appropriate metering of the fuel amount can likewise be mathematically ascertained. In the embodiment of FIG. 1 the fuel metering results by way of an injection valve arrangement 40 as an actuator, which is activated by the control device 30.

With the aid of a third exhaust gas sensor 42 disposed behind the first catalytic converter and a fourth exhaust gas sensor 44 disposed behind the second catalytic converter, the fill level of the catalytic converters 14 and 16 with oxygen is checked. It is additionally understood that the number of sensors and of the actuator is not finally determined and that alternatively or supplementary additional sensors and actuators can be connected to the control device 30.

FIG. 2 shows a flow diagram as an example of embodiment of the procedure according to the invention. The control device 30 is thereby so designed to control the progression of the procedure and/or its embodiments. Step 46 represents a main program HP of overriding importance, with which the control device 30 controls the internal combustion engine. In step 48 the control device 30 ascertains an amount of oxygen, which is stored by the catalytic converter 14. This amount of oxygen is also henceforth designated as the oxygen storage capacity OSC_14, although it represents actually only a lower limit value for the actual oxygen capacity of the catalytic converter 14.

In an embodiment the ascertainment occurs in such a way that initially a reductive exhaust gas ambiance is generated in front of the catalytic converter 14. In so doing, the associated combustion chambers 22 and 24 are operated in each case with a fuel/air-mixture, which does not completely combust in the combustion chambers 22, 24. Non-combusted hydrocarbons are for that reason introduced with the exhaust gas mass flow 18 into the first catalytic converter 14 and react there with the stored oxygen. The reductive exhaust gas ambiance is maintained just as long as it takes for all of the oxygen to be consumed in the catalytic converter 14. In the embodiment of FIG. 1, this can be recognized by the behavior of the signal of the rear exhaust gas sensor 42.

In the normal operation of the internal combustion engine 10, the fuel/air-ratio of the combustion chambers 22, 24, 26, 28 of the internal combustion engine 10 is closed-loop controlled on the basis of signals of the forward exhaust gas sensors 36 and 38. By means of the process of the closed-loop control, a periodic oscillation of the oxygen concentration in front of the catalytic converter 14 arises. Behind the catalytic converter, the oscillation occurs under normal conditions only in a significantly dampened form. The rear exhaust gas sensor 42 indicates for this reason under normal conditions an average oxygen concentration. If then under diagnostic conditions all of the oxygen from the catalytic converter 14 has been consumed, the third exhaust gas sensor 42 also indicates an oxygen deficiency. The catalytic converter 14 is thus definitively emptied.

The control device registers this condition and produces subsequently an oxidized exhaust gas ambiance in front of the catalytic converter 14, in that it, for example, reduces the amounts of fuel to be injected.

From the known operating parameters in the control device 30, the control device 30 calculates in step 48 especially the oxygen amount from the exhaust gas mass flow 18 during an oxidized ambiance, which is introduced into the first catalytic converter 14, until a break condition is fulfilled. The break condition is then, for example, fulfilled, if the oxygen amount OSC_14 exceeds a threshold value SW1. The oxygen storage capacity OSC_14 is thus in any case greater than the threshold value SW1. If the oxygen storage capacity is no longer sufficient to achieve the threshold value SW1, the rear exhaust gas sensor 42 will register an oxygen surplus, if the catalytic converter can no longer accept any additional oxygen. By way of the reaction of the rear exhaust gas sensor 42, a break condition is likewise fulfilled and the value of the amount of oxygen OSC_14 achieved to this point of time is stored.

By way of the break conditions, a comparison results in step 48 between the oxygen storage capacity OSC_14 of the catalytic converter 14 and the threshold value SW1. Possible results E1 of the comparison are ones where the oxygen storage capacity is better or worse than the threshold value SW1.

In step 50 the additional threshold value SWW is formed as a function of the result E1 (SWW=f(E1)). In addition the explanations to FIG. 3 should be consulted. Subsequently an oxygen storage capacity OSC_16 of the second catalytic converter 16 is ascertained in step 52. This occurs preferably in the same manner as the ascertainment of the oxygen storage capacity OSC_14 of the first catalytic converter 14.

In step 54 a second result E2 is formed as a function of the additional threshold value SWW and the oxygen storage capacity OSC_16. Possible results E2 of the comparison are also in this case that the oxygen storage capacity OSC_16 is better or worse than the threshold value SWW. In step 58 a diagnostic result D is formed as a function of the first result E1 and the second result E2.

Various functions between the first threshold value SW1, the additional threshold value SWW and possible diagnostic results are explained below with FIG. 3 in mind. FIG. 3 shows in detail a coordinate system with a OSC_14 axis and a OSC_16 axis, in which different areas are drawn in.

On both axes the oxygen storage capacity of a so-called marginal catalytic converter is plotted as OSC_GK. The oxygen storage capacity OSC_GK of the marginal catalytic converter marks a transition from a catalytic converter with a still sufficient conversion capability to a catalytic converter with a conversion capability, which is no longer sufficient.

The area 70 corresponds to an amount of all the pairs from OSC_14 values and OSC_16 values, which in each case are greater than OSC_GK. This area 70 corresponds for this reason to the diagnostic results D, which in the state of the art indicated a good condition of the catalytic converter system. The evaluation of the emissions of both catalytic converters 14, 16 thus occurred independent of each other. For this reason the condition of each individual catalytic converter 14, 16 was also separately evaluated.

Within the scope of this application, the catalytic converter system 12 is in contrast also still evaluated as sufficiently in working order, if a bonus of the oxygen storage capacity of a catalytic converter 14 (or 16) compensates for a penalty (malus) of the oxygen storage capacity of the other catalytic converter 16 (or 14). In the ideal case a catalytic converter system 12 with a catalytic converter, which has the doubled oxygen storage capacity of a borderline catalytic converter, even then is assessed to be in a functional working order, if the other catalytic converter can no longer store any oxygen. The case must also be recognized, in which both catalytic converters are marginal catalytic converters. For that reason three points a, b, c occur in theory for a catalytic converter dependent on the diagnostic threshold. In reality the diagnostic threshold, however, does not run continually linear. At OSC_14 values of a first catalytic converter 14, which are smaller than the minimum value OSC_mm, even a very good second catalytic converter 16 can no longer push the overall emissions under the legal marginal values.

In an embodiment the possibility exists to assess the catalytic converters 14, 16 in the vicinity 71 of the point b, in which both catalytic converters are borderline, either to be in a functional working order or in an insufficient working order.

The first threshold value SW1 is preferably so predetermined, that it is greater than the oxygen storage capacity OSC_GK of the marginal catalytic converter. A test is made in this manner to see if the first catalytic converter 14 possesses the stated bonus. In so doing, the first threshold value SW1 in a preferred embodiment is smaller than the oxygen storage capacity OSC_max of a catalytic converter 14 classified as new. In this embodiment the oxygen storage capacity OSC_14 is ascertained only up to the first threshold value SW1. Because of that, no qualitative statement exists with regard to how much oxygen the catalytic converter 14 actually can store. The information, however, is sufficient for an assessment of its potential to compensate for a penalty (malus) of the other catalytic converter 16. In order to be able to compensate for such a penalty (malus), the bonus of the better catalytic converter must be correspondingly large. In order to ascertain such a bonus, a smaller emissions' disadvantage must initially be accepted due to the longer rich and lean phase. This disadvantage is, however, at least partially compensated for, in that the oxygen storage capacity of the second catalytic converter is measured out only up to a smaller threshold value. In total the emissions additionally produced during the diagnosis can even be reduced under certain conditions in comparison to the individual monitoring of the catalytic converters.

Especially the oxygen storage capacity OSC_14 of the first catalytic converter 14 is then only tested to see if it achieves the first threshold value SW1. For that reason the nitrogen oxide emissions occurring more significantly during the ascertainment of the oxygen storage capacity OSC_14 during an oxidized exhaust gas ambiance are limited.

If the OSC_14 achieves the first threshold value SW1, the additional threshold value SWW is determined in an embodiment as a fixed value. The fixed value SWW is thereby preferably smaller than the oxygen storage capacity OSC_GK of the marginal catalytic converter, if the oxygen storage capacity OSC1 of the first catalytic converter is greater than the first threshold value SW1. In this manner an area 72 results from possible pairs of values for OSC_14 and OSC_16, for which the catalytic converter system 12 is likewise assessed to be in a sufficiently functional working order. It is valid for the area 72 that a bonus of OSC_14 compensates for a penalty (malus) of OSC_16. In the opposite case the area 74 unfolds as one, in which a bonus of OSC_16 compensates for a penalty (malus) of OSC_14.

Provision is made within the scope of additional embodiments to determine the additional threshold value SWW not as a fixed value but as a variable function of the oxygen storage capacity OSC_14 of the first catalytic converter, if this function does not achieve the first threshold value SW1.

For that purpose, the additional threshold value SWW is determined in an embodiment in such a way that it results in a point on a straight line 76 together with the ascertained oxygen storage capacity OSC_14 of the first catalytic converter 14. The straight line is established by the following points: a first point b is defined by the oxygen storage capacities of the marginal catalytic converters and a second point d is defined by the fixed value for SWW and the first threshold value SW1. The area 78 lying above the straight line 76, which does not yet count as a part of area 70, comes additionally in this embodiment as a good-area for the catalytic converter system 12. Analogously an additional straight line 80 and an additional good-area between the straight line 80 and the area 70 arise for the case that OSC_16 is greater than OSC_14.

Provision is made in an additional embodiment for the variable function to be a continually differentiable curve, a hyperbolical curve 84.

In practice the hyperbolical progression will be replaced by a traverse, as it occurs in FIG. 3 as a chain of straight line sections. In the depiction of FIG. 3, these are the left edge of the area 74, of the straight line 80, of the straight line 76 and of the lower edge of the area 72. Thereby the area of possible pairs of values of the oxygen capacities of both catalytic converters 14, 16 for the overall catalytic converter system is assessed still as sufficiently in a functional working order and in comparison to the area 70 significantly enlarged.

The progression of this curve 84 can be determined by a mathematical equation based on a model, if the connection between the oxygen storage capacity and the HC/No$_x$ conversion is ascertained and used for the formation of the entire exhaust gas conversion. The advantage of this embodiment lies with the fact, that the application of the diagnostic thresholds is drastically simplified by the mathematical formulation.

It can be assumed for the mathematical formulation from the following connection between a HC-conversion K to an oxygen storage capacity OSC:

$$K=1-\exp(-OSC/OSC_G)=1-\exp(-y)=f(y)$$

with a standardized oxygen storage capacity $y=OSC/OSC_G$ whereby G designates a marginal catalytic converter.

It is characteristic that such a curve for large Y runs basically asymptotically toward 1 and possesses a steep initial gradient. Depending upon the definition of a marginal catalytic converter, one can select a general formulation:

$K=1-\beta\exp(-y)$, whereby β provides a scaling of the HC-conversion of the marginal catalytic converter.

For the entire conversion K of an arrangement with two catalytic converters 14, 16, the following is then valid:

$$K=(K\_14+K\_16)/2=1-\beta(\exp(-y\_14)+\exp(-y\_16)/2.$$

The good-area in FIG. 3 can then be enlarged still up to curve 84. This formulation works for any desired formulation $K=f(y, \beta)$.

The invention claimed is:

1. A method of diagnosing a catalytic converter system having at least a first and second catalytic converter through which two separate exhaust gas flows flow, the method comprising:

determining whether oxygen storage capacities of the first and second catalytic converter exceed a predetermined threshold value, wherein an oxygen storage capacity of the first catalytic converter is compared with at least one first threshold value and in that an additional threshold value different from the at least one first threshold value is ascertained as a function of a result of the comparison and an oxygen storage capacity of the second catalytic converter is compared with the additional threshold value, and wherein the additional threshold value is determined as a variable function of the oxygen storage capacity of the first catalytic converter when said capacity does not achieve the at least one first threshold value.

2. A method according to claim 1, wherein the at least one first threshold value is less than an oxygen storage capacity of a catalytic converter classified as new.

3. A method according to claim 1, wherein the additional threshold value is determined as a fixed value when the oxygen storage capacity of the first catalytic converter achieves the at least one first threshold value.

4. A method according to claim 1, wherein the additional threshold value lies in a plane constructed by values for the oxygen storage capacity of the first catalytic converter and by values for the oxygen storage capacity of the second catalytic converter on a straight line, on which a point lies, which is defined by oxygen capacities of marginal catalytic converters and on which a point lies, which is defined by the fixed value and the at least one first threshold value.

5. A method according to claim 1, wherein the variable function is a continually differentiable curve that lies in a plane constructed by values for the oxygen storage capacity of the first catalytic converter and by values for the oxygen storage capacity of the second catalytic converter.

6. A method according to claim 1, wherein the at least one first threshold value is greater than an oxygen storage capacity of a marginal catalytic converter that serves as a transition from one catalytic converter that has a sufficient conversion capability to a catalytic converter that has an insufficient conversion capability.

7. A method according to claim 6, wherein the additional threshold value is less than the oxygen storage capacity of the marginal catalytic converter when the oxygen storage capacity of the first catalytic converter is greater than the at least one first threshold value.

8. A control device to diagnose a catalytic converter system that has at least a first and second catalytic converter through which separate exhaust gas flows flow, wherein the control device is configured to evaluate whether oxygen storage capacities of the first and second catalytic converters exceed a predetermined threshold value, and wherein the control device is further configured to compare the oxygen storage capacity of the first catalytic converter with at least one first threshold value, ascertain an additional threshold value different from the at least one first threshold value as a function of a result of the comparison and compare the oxygen storage capacity of the second catalytic converter with the additional threshold value, wherein the additional threshold value is determined as a variable function of the oxygen storage capacity of the first catalytic converter when said capacity does not achieve the at least one first threshold value.

* * * * *

UNITED STATES PATENT AND TRADEMARK OFFICE
CERTIFICATE OF CORRECTION

| | |
|---|---|
| PATENT NO. | : 7,891,169 B2 |
| APPLICATION NO. | : 11/644053 |
| DATED | : February 22, 2011 |
| INVENTOR(S) | : Schneider et al. |

It is certified that error appears in the above-identified patent and that said Letters Patent is hereby corrected as shown below:

Col. 4, line 59: "minimum value $OSC\_mm$, even" should read --minimum value $OSC\_min$, even--

Signed and Sealed this
Thirteenth Day of September, 2011

David J. Kappos
*Director of the United States Patent and Trademark Office*